United States Patent
Jang et al.

(10) Patent No.: US 9,506,737 B2
(45) Date of Patent: Nov. 29, 2016

(54) DEVICE FOR DETECTING BANKNOTE THICKNESS

(71) Applicants: Sang Hwan Jang, Seoul (KR); Sung Am Kim, Busan (KR)

(72) Inventors: Sang Hwan Jang, Seoul (KR); Sung Am Kim, Busan (KR)

(73) Assignee: Kisan Electronics Co., Ltd., Seoul (KR)

( * ) Notice: Subject to any disclaimer, the term of this patent is extended or adjusted under 35 U.S.C. 154(b) by 303 days.

(21) Appl. No.: 14/199,853

(22) Filed: Mar. 6, 2014

(65) Prior Publication Data

US 2015/0042353 A1   Feb. 12, 2015

(30) Foreign Application Priority Data

Aug. 12, 2013   (KR) .................. 10-2013-0095666

(51) Int. Cl.
| | |
|---|---|
| G01N 27/60 | (2006.01) |
| G01B 7/06 | (2006.01) |
| G07D 7/02 | (2016.01) |
| B65H 16/00 | (2006.01) |
| B65H 1/00 | (2006.01) |
| B65H 45/00 | (2006.01) |

(52) U.S. Cl.
CPC ............ *G01B 7/087* (2013.01); *G07D 7/026* (2013.01); *B65H 1/00* (2013.01); *B65H 16/00* (2013.01); *B65H 45/00* (2013.01)

(58) Field of Classification Search
CPC ........ B65H 1/00; B65H 16/00; B65H 29/00; B65H 45/00
See application file for complete search history.

(56) References Cited

U.S. PATENT DOCUMENTS

| | | | | |
|---|---|---|---|---|
| 4,177,151 A | * | 12/1979 | Siu ................. | C11D 17/047 206/0.5 |
| 4,446,735 A | * | 5/1984 | Weilacher ........... | G01B 17/02 73/159 |
| 4,761,205 A | * | 8/1988 | Crane ................ | B41M 3/14 162/103 |

(Continued)

FOREIGN PATENT DOCUMENTS

| | | | |
|---|---|---|---|
| CN | 203057670 U | * | 7/2013 |
| KR | 10-0960126 B1 | | 5/2010 |

OTHER PUBLICATIONS

Notice of Submission of Opinion for Korean Patent Application 10-2014-0038266 from the Korean Intellectual Property Office dated Sep. 29, 2014, with a partial English translation.

(Continued)

*Primary Examiner* — Jermele M Hollington
*Assistant Examiner* — Temilade Rhodes-Vivour
(74) *Attorney, Agent, or Firm* — Andrew D. Fortney; Central California IP Group, P.C.

(57) ABSTRACT

A device for detecting a banknote thickness includes a transmission electrode and a reception electrode facing one another at a predetermined interval and forming an electric field when a driving voltage is applied thereto; a driving voltage applying unit configured to apply a driving voltage having a pre-determined frequency and form an electric field between the transmission electrode and the reception electrode; a current detecting unit configured to detect a current when a banknote is between the transmission electrode and the reception electrode; an antistatic device configured to remove static electricity from the banknote; and a controller configured to detect at least one of a changed current (e.g., when the banknote is present) and a corresponding voltage waveform, and to detect one or more of a state, a thickness and a type of the banknote based on the detected current change or voltage waveform.

23 Claims, 7 Drawing Sheets

(56) References Cited

U.S. PATENT DOCUMENTS

| | | |
|---|---|---|
| 5,122,754 A | 6/1992 | Gotaas |
| 5,308,992 A | 5/1994 | Crane et al. |
| 5,394,969 A | 3/1995 | Harbaugh |
| 5,434,427 A | 7/1995 | Crane et al. |
| 7,544,266 B2 * | 6/2009 | Herring ................ B32B 38/145 156/277 |
| 8,028,990 B2 | 10/2011 | Miyamoto | 
| 2006/0097444 A1 * | 5/2006 | Spinetti .................... B65H 5/28 271/216 |

OTHER PUBLICATIONS

Jung Ho Ann; "Method for Measuring Thickness of a Paper Money in a Paper Money Put Machine"; Bibliographic Data of KR100960126 (B1); May 27, 2010; Espacenet.

* cited by examiner

(a) Thread – new note (b) Thread – old note (c) Hologram (d) tape attached (e) moist banknote with adhesive tape

FIG. 8

DEVICE FOR DETECTING BANKNOTE THICKNESS

CROSS-REFERENCE TO RELATED APPLICATION

The present application claims the benefits of priority of Korean Patent Application No. 10-2013-0095666 filed with the Korean Intellectual Property Office on Aug. 12, 2013. The content of this application is incorporated herein by reference in its entirety.

BACKGROUND OF THE INVENTION

1. Field of the Invention

The present invention relates to a device for detecting a banknote thickness, and more particularly, to a device for detecting a banknote thickness capable of detecting one or more of a thickness of a banknote, a state of a banknote, whether a foreign object is on a banknote, or a type (e.g. denomination or national currency) of a banknote, using an electrostatic capacity property.

2. Description of the Prior Art

In general, a bill validator is installed in a bill counting machine, a vending machine, an automatic teller machine (ATM), or the like, to determine whether an input banknote is proper. For example, the bill validator determines whether a banknote is a new one, old one, damaged one, or forged one.

For reference, the bill validator described in the present invention is used to include a concept covering all of a bill counting machine having a bill validating function, a paper money discriminating machine having a counting function, and the like, as well as supporting bill validation. The bill validator is used in financial institutions, such as banks, cash transport firms, currency exchange offices, credit unions, or post offices, and business units such as casinos, restaurants, department stores, supermarkets, duty-free shops, big-box retailers, or convenience stores dealing with checks and cashes. The bill counting machine includes a banknote thickness detecting device for measuring a thickness of a banknote to accurately count a withdrawal or deposit amount of money requested by a user, or determine whether banknotes overlap or whether a foreign object is on a banknote.

The banknote thickness detecting device measures a thickness of a counted banknote and compares the measured thickness with a pre-determined reference thickness, namely, reference banknote thickness data corresponding to a sheet of banknote, and when the measured banknote thickness data is identical to the pre-determined reference banknote thickness data within tolerance according to the comparison results, the banknote thickness detecting device determines that a sheet of banknote is normally processed.

However, banknotes to be counted may randomly include an old banknote which has been already issued and used, a crumpled banknote, a folded banknote, a wet banknote, a stained banknote, a tape-attached banknote, as well as a newly issued banknote. Namely, the new banknote has a uniform thickness, but an old banknote may have a different thickness according to a state thereof, and in particular, in case of a tape-attached banknote, it may have a greater thickness in a region thereof in which a tape is attached, although it is a sheet of banknote.

Thus, a ultrasonic sensor scheme or a thickness detection roller scheme conventionally used for detecting a thickness of a banknote may erroneously determine a sheet of old banknote as two or more sheets of new banknote, or conversely, erroneously determine two or more sheets of new banknote as a sheet of old banknote and incurs high manufacturing costs.

A background art of the present invention is disclosed in Korean Patent Application Publication No. 10-2006-0060758 (published on Jun. 5, 2006 and entitled "banknote thickness detecting device").

SUMMARY OF THE INVENTION

An aspect of the present invention may provide a device for detecting a banknote thickness capable of detecting one or more of a thickness of a banknote, a state of a banknote, whether a foreign object is on a banknote, or a type of a banknote, using an electrostatic capacity property.

An aspect of the present invention may also provide a device for detecting a banknote thickness capable of detecting a hologram, a security thread or a metal fiber in a banknote, and even a banknote with moisture, as well as a banknote thickness.

An aspect of the present invention may also provide a device for detecting a banknote thickness capable of detecting a banknote having a thickness increased due to stain thereon, moisture, or crumpling, or the like, and a banknote having a thickness increased as two or more sheets of banknote overlap.

According to an aspect of the present invention, a device for detecting a banknote thickness may include a transmission electrode and a reception electrode facing one another at a predetermined interval and forming an electric field when a driving voltage is applied thereto; a driving voltage applying unit configured to apply the driving voltage (which may have a pre-determined frequency) to form the electric field between the transmission electrode and the reception electrode; a current detecting unit configured to detect a current when a banknote is between the transmission electrode and the reception electrode; an antistatic device configured to remove static electricity from the banknote (e.g., between the transmission electrode and the reception electrode); and a controller configured to detect at least one of a changed current when the banknote is present (e.g., between the transmission electrode and the reception electrode) and a corresponding voltage waveform, and to detect or discriminate among one or more of a state, a thickness and a type of the banknote based on the detected current change or voltage waveform.

According to another aspect of the present invention, a device for detecting a banknote thickness may comprise a transmission electrode and a reception electrode forming an electric field when a driving voltage is applied thereto, wherein the transmission electrode and the reception electrode comprise: an antistatic device comprising a conductive material on facing surfaces of the transmission electrode and the reception electrode; and a dielectric structure comprising an insulating material, between the electrodes (e.g., the transmission and reception electrodes) and the antistatic device.

According to exemplary embodiments of the present invention, since a thickness of a banknote is detected using an electrostatic capacity property, manufacturing costs of the device may be reduced, a thickness detection signal output from the device may be intuitive and easily handled, a banknote having a hologram, a security thread or a metal fiber therein, and even moisture, as well as a banknote thickness, may be detected, and even a thickness of a banknote which becomes thick due to a stain thereon, moisture, crumple, or the like, and a thickness of a banknote which becomes thick as two or more sheets of overlapping banknotes may be discriminated, whereby accuracy of discrimination may be improved.

BRIEF DESCRIPTION OF THE DRAWINGS

The above and other objects, features and advantages of the present invention will be more apparent from the following detailed descriptions taken in conjunction with the accompanying drawings, in which.

DETAILED DESCRIPTION

Hereinafter, a device for detecting a banknote thickness and a method hereof according to exemplary embodiments of the present invention will be described with reference to the accompanying drawings.

In the drawings, thicknesses of lines, dimensions of elements, and the like, may be exaggerated for clarity and convenience. Also, terms described hereinafter may be defined in consideration of functions in exemplary embodiments of the present invention and may be changed according to an intention or a custom of a user or an operator. Thus, definitions of terms should be defined on the basis of content throughout the specification.

Figure 1:
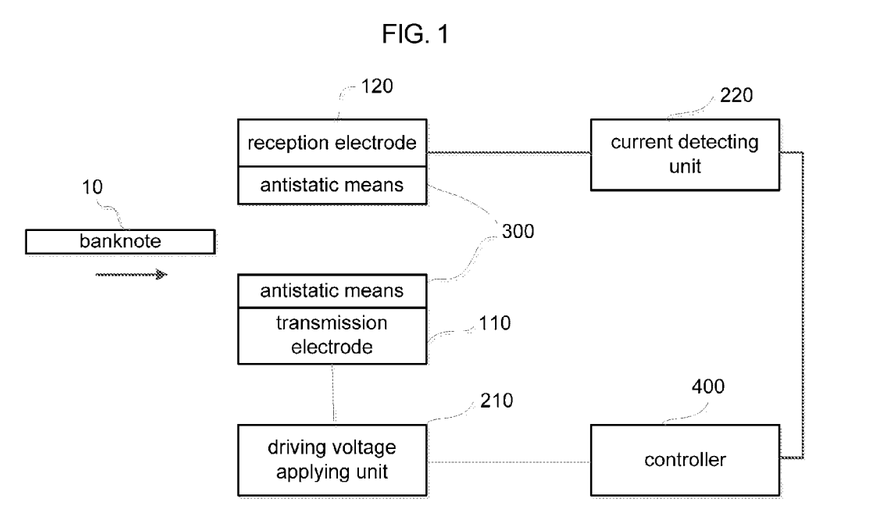
FIG. 1 is a view illustrating a schematic configuration of a device for detecting a banknote thickness according to an exemplary embodiment of the present invention.

FIG. 1 is a view illustrating a schematic configuration of a device for detecting a banknote thickness according to an exemplary embodiment of the present invention.

As illustrated in FIG. 1, the device for detecting a banknote thickness according to the exemplary embodiment of the present invention includes a transmission electrode 110, a reception electrode 120, a driving voltage applying unit 210, a current detecting unit 220, an antistatic device 300, and a controller 400.

When a voltage is applied through the driving voltage applying unit 210, an electric field is formed between the transmission electrode 110 and the reception electrode 120, and here, electricity is accumulated to one side (for example, the reception electrode) due to the force that attracts two different poles toward each other. Here, an accumulated amount of electricity (namely, electrostatic capacity) is increased as an area of each of electrode plates constituting the transmission electrode 110 and the reception electrode 120 is larger, as a distance between the electrode plates is shorter, or as a dielectric constant of an insulator between the electrode plates is higher. For reference, electrostatic capacity (C) may be calculated as '$C = \in(S/d)$', wherein $\in$ is a dielectric constant, S is an area of an electrode plate (unit: $m^2$), and d is a distance between the electrode plates (unit: m).

Figure 2:
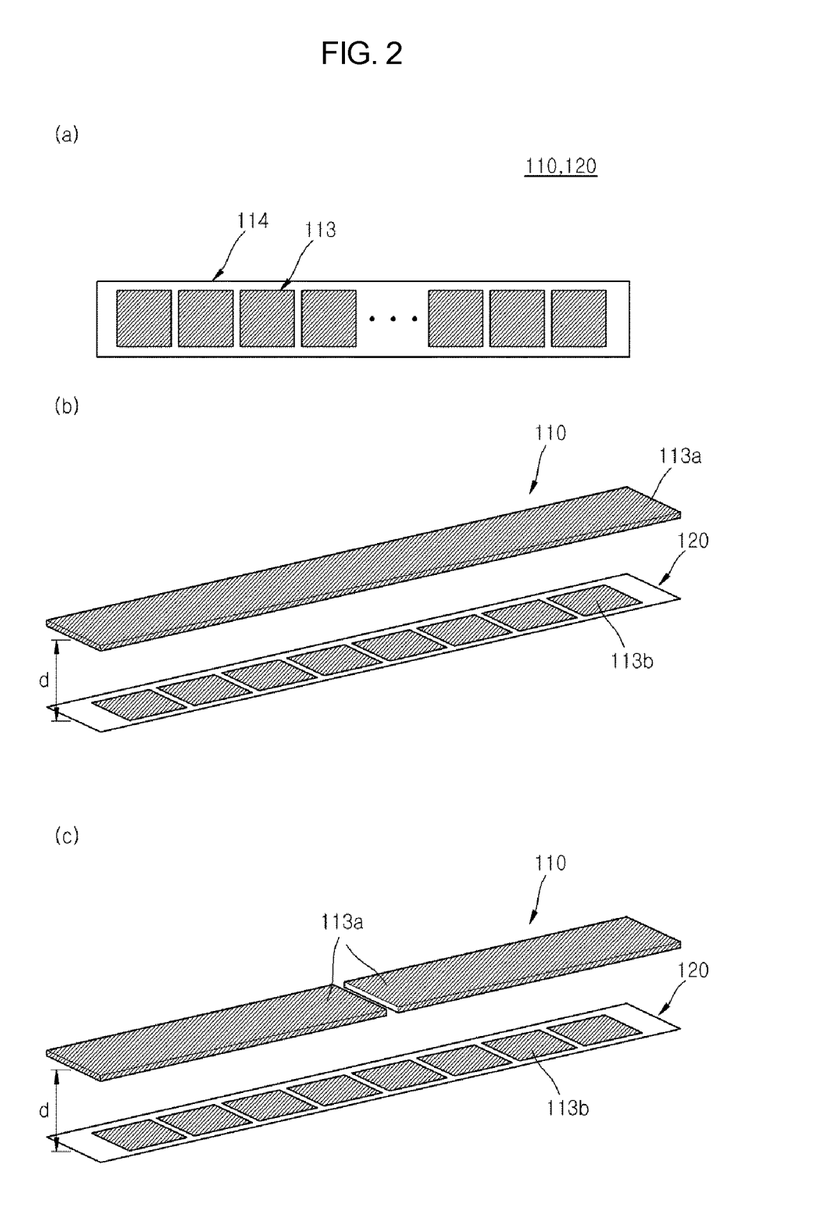
FIGS. 2(a)-(c) illustrate various shapes of a transmission electrode and a reception electrode that can be used in the exemplary device for detecting a banknote thickness of FIG. 1.

The transmission electrode 110 and the reception electrode 120 are formed to face each other at a pre-determined interval therebetween. A distance between the transmission electrode 110 and the reception electrode 120 is as large as to allow a banknote to pass therethrough, and a smaller distance is preferred. In the present exemplary embodiment, the electrode plates 113 (please refer to (a) in FIG. 2) formed in the transmission electrode 110 and the reception electrode 120 have the same shape (for example, a square shape), the same size, and the same number (for example, one to fifteen). However, sizes, shapes, and numbers of the transmission electrodes or reception electrodes may be variously modified according to an embodiment environment or a design purpose. For example, the transmission electrode 110 may be formed of one electrode plate 113a having an elongated rectangular shape, and the reception electrode 120 facing the transmission electrode 110 may be formed of a plurality of electrode plates 113b having the same square shape and spaced at uniform intervals (please refer to (b) in FIG. 2). Further, the transmission electrode 110 may be formed of two electrode plates 113 respectively having an elongated rectangular shape and the reception electrode 120 corresponding to the respective transmission electrodes 110 may be formed of a plurality of electrode plates 113b having the same square shape and spaced at uniform intervals (please refer to (c) in FIG. 2). Here, the number of electrode plates 113 (namely, the number of channels) may be more or fewer (namely, multi-channels may be designed) and the electrode plates 113 may be made of a conductive material (namely, a conductor).

FIG. 2 shows views illustrating various shapes of a transmission electrode and a reception electrode in FIG. 1. Here, the transmission electrode 110 and the reception electrode 120 have the same shape, so only the shape of the transmission electrode 110 will be described for description purposes.

As illustrated in FIG. 2, one or more electrode plates (multi-channel electrode plates) 113 formed in the transmission electrode 110 and the reception electrode 120 may be formed uniformly spaced on one surface (for example, a surface coated with copper or a copper foil) of a circuit board 114 in a printing manner or a pattern etching. Namely, the electrode plates 113 may be formed of a conductive material pattern such as aluminum, silver, copper or alloy thereof.

In a case in which a driving voltage is applied to the transmission electrode 110 and the reception electrode 120 (substantially, in a case in which an electric field is formed by a driving voltage applied to the electrode plates formed in the transmission electrode 110 and the reception electrode 120), electrons are moved toward the positive (+) electrode (namely, the transmission electrode 110). Namely, while it is neutral overall when viewed from the outside, one side (for example, negative electric charges (−) are strongly formed in one side (for example, the transmission electrode 110) and positive electric charges (+) are strongly formed in the other side (for example, the reception electrode 120), to generate polarization. In this manner, a dielectric material (for example, air) existing between the transmission electrode 110 and the reception electrode 120 is polarized by the electric field applied to the transmission electrode 110 and the reception electrode 120 and the polarized electric charges hold more electric charges of the each electrode plate 113. As a result, a large amount of electric charges are accumulated in the electrode plates 113 formed in each of transmission electrode 110 and the reception electrode 120. Namely, a dielectric material allowing polarization to easily occur makes a larger amount of electricity to be accumulated in the electrode plates 113, and here, permittivity is a measure of how easily polarization occurs, and a dielectric constant is a value determined to be proportional based on 1 as permittivity of air. In general, permittivity refers to a dielectric constant.

For example, in a case in which only air exists between the transmission electrode 110 and the reception electrode 120, permittivity is so low that a small amount of current flows, and when a banknote 10 having high permittivity is input (or passed) between the transmission electrode 110 and the reception electrode 120, a current is increased, relative to that in the presence of only air. Also, when both a banknote 10 and a tape (for example, a banknote with a tape attached thereto) are simultaneously input to between the two electrodes 110 and 120, currents are further increased due to the objects having high permittivity. Thus, in the present invention, based on the characteristics of permittivity varying depending on a type, a state or a thickness of the banknote 10 input between the transmission electrode 110 and the reception electrode 120, the thickness, the state, or the type of the banknote 10 can be detected and discriminated.

The driving voltage applying unit 210 applies a driving voltage to between the transmission electrode 110 and the reception electrode 120. For reference, in a case in which a driving voltage has a direct current (DC), resistance between the transmission electrode 110 and the reception electrode 120 has an infinite resistance value (namely, reactance). However, in a case in which a driving voltage has an alternating current (AC), a resistance value is reduced as a frequency is higher, allowing a current to flow well. Thus, the driving voltage applying unit 210 applies a driving voltage having a high frequency between the transmission electrode 110 and the reception electrode 120. Here, the frequency is controlled by the controller 400.

The current detecting unit 220 detects a current flowing when the banknote 10 is input between the transmission electrode 110 and the reception electrode 120, that is, a flow of current changed due to the input of the banknote 10 between the electrodes 110 and 120. The current detecting unit 220 may convert a flow of current according to a change in current into a voltage waveform to detect the flow of current. Of course, the current detecting unit 220 may output a current waveform itself according to an exemplary embodiment.

Figure 3:
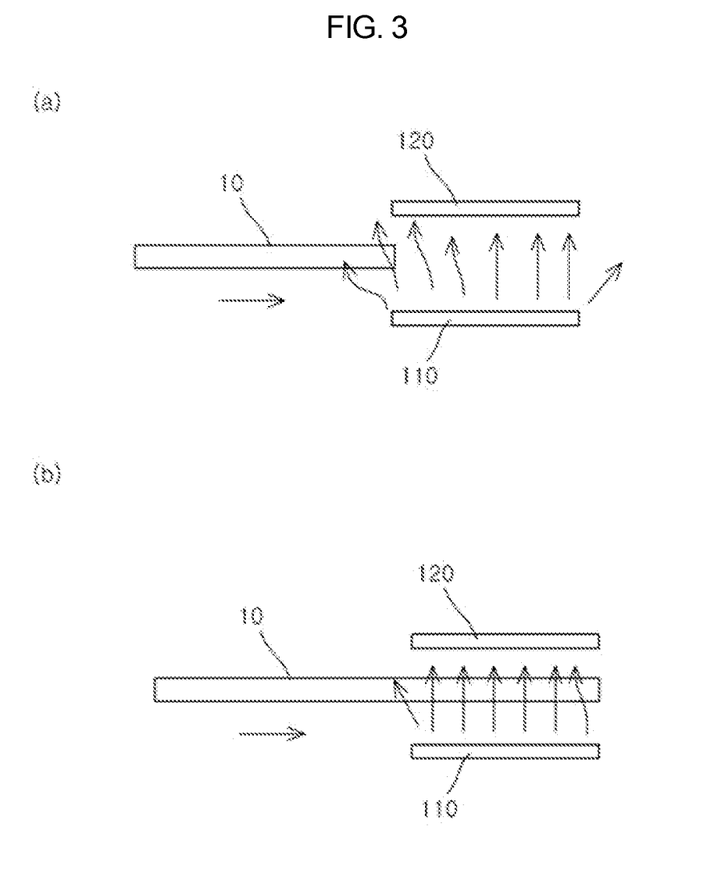
FIGS. 3(a)-(b) illustrate an undershoot or an overshoot generated due to static electricity when a banknote is input in the exemplary device for detecting a banknote thickness of FIG. 1.

FIG. 3 illustrates an undershoot or an overshoot generated due to static electricity when a banknote is input in FIG. 1.

As illustrated in (a) of FIG. 3, at a point in time at which the banknote 10 is input between the transmission electrode 110 and the reception electrode 120, a portion of a line of electric force is drawn out by the banknote 10, a signal induced to the reception electrode 120 is reduced. Namely, an undershoot occurs. Also, as illustrated in (b) FIG. 3, at a point in time at which the banknote 10 is completely input between the transmission electrode 110 and the reception electrode 120, a line of electric force generated at the edge of the transmission electrode 110 is bent inwardly by the banknote 10, rather than being drawn out, increasing a signal induced to the reception electrode 120. Namely, an overshoot occurs. The undershoot or the overshoot generated when the banknote 10 is input between the electrodes degrades stability of a voltage waveform. Namely, it degrades operation reliability of the device for detecting a banknote thickness.

Figure 4:
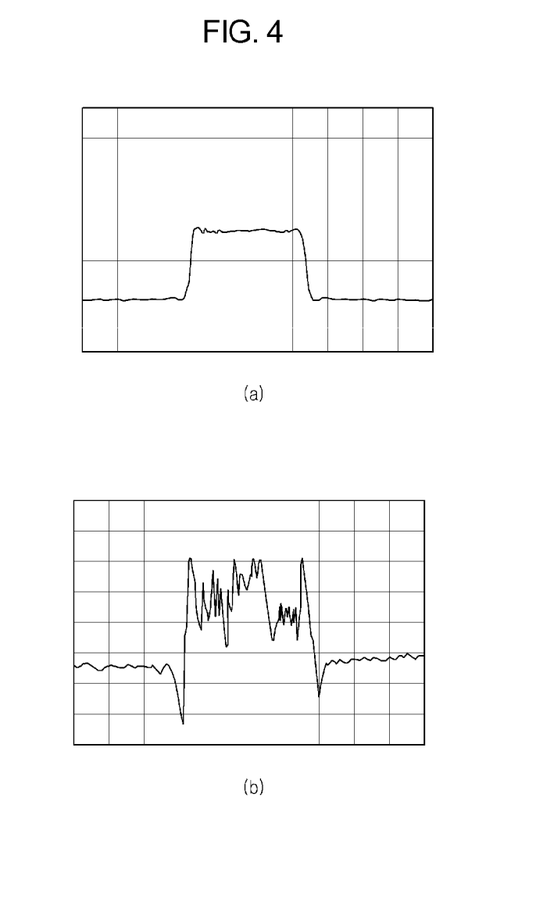
FIGS. 4(a)-(b) are views illustrating waveforms of voltages detected according to a changed current when a banknote is present in the exemplary device for detecting a banknote thickness of FIG. 1.

FIG. 4 is views illustrating waveforms of voltages detected according to a changed current when a banknote is present or input in FIG. 1. Specifically, (a) in FIG. 4 is a view illustrating a normal waveform detected when a banknote with no error causing factor is input, and (b) in FIG. 4 is a view illustrating an abnormal waveform detected when an error causing factor such as vibration or static electricity is present.

The antistatic device 300 performs function for removing static electricity on the banknote 10 input or passing between the transmission electrode 110 and the reception electrode 120. Thus, a thickness of the banknote 10 may be stably and reliably detected. The antistatic device 300 may be disposed or provided as a film, a layer, a sheet or a plate formed of a conductive material including a conductive plastic, or as a structure of a thin film coated with a conductive material on an insulating substrate. Namely, the antistatic device 300 may be formed to have a predetermined thickness, attached in the form of a film formed of a conductive material, and covering a large electrode surface. Also, the antistatic device 300 may be formed in the form of a film layer coated with an electro-conductive polymer on the surface of an insulating substrate. Further, for example, a paperboard with graphite uniformly coated thereon may be attached onto facing surfaces of the transmission electrode 110 and the reception electrode 120.

Figure 5:
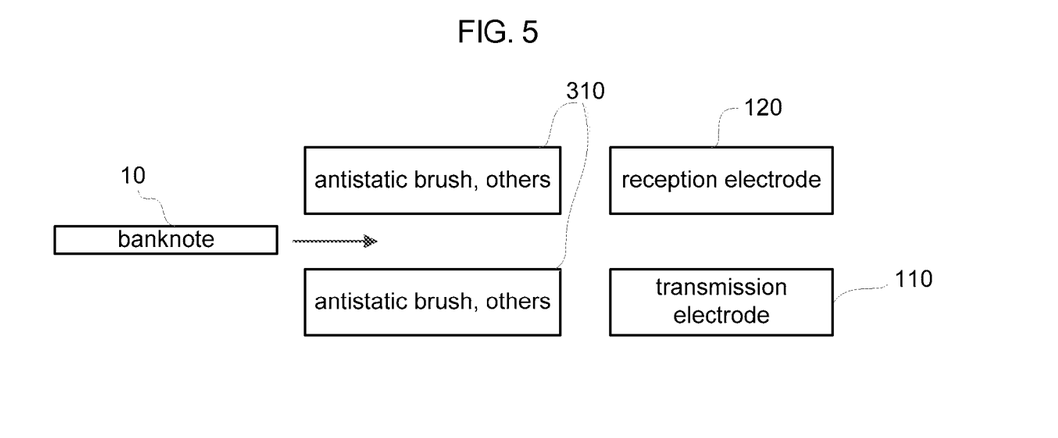
FIG. 5 is a view illustrating a method of disposing an antistatic device in the exemplary device for detecting a banknote thickness of FIG. 1.

Besides, as illustrated in FIG. 5, an antistatic member 310 formed of a metal such as aluminum, a conductor, an antistatic brush, or the like, may be further disposed in an appropriate position (or a front side of the transmission electrode and the reception electrode in a direction in which the banknote is moving) between a banknote hopper part (not shown) and the electrode plates (namely, the transmission electrode and the reception electrode) to increase static electricity removal effect. Here, the antistatic device 300 needs to be insulated from the respective electrode plates 113 of the transmission electrode 110 and the reception electrode 120. Also, the antistatic device 300 may be configured to cover the top surfaces or the top and lateral surfaces of the respective electrode plates 113 of the transmission electrode 110 and the reception electrode 120. Thus, a bracket 115 as illustrated in FIG. 6 may be used to insulate the antistatic device 300 from the electrode plates 113 formed in the transmission electrode 110 and the antistatic device 300 from the electrode plates 113 formed in the reception electrode 120, to protect the electrode plates 113 from being contaminated from the outside, or to fix them within the device.

Figure 6:
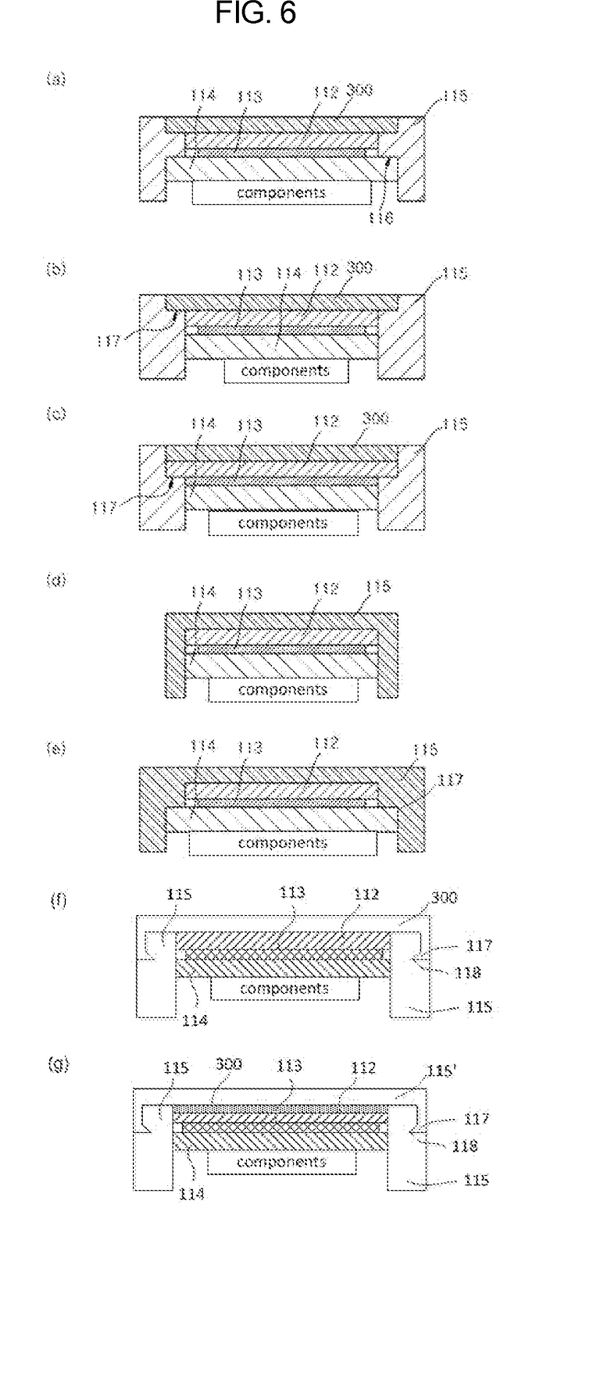
FIGS. 6(a)-(g) show views schematically illustrating cross-sections of exemplary devices for detecting a banknote thickness configured using brackets having various shapes.

FIG. 6 are views schematically illustrating cross-sections of the device for detecting a banknote thickness configured using brackets having various shapes in FIG. 1. As illustrated in FIG. 6, the bracket 115 may have various shapes. Here, the shapes of the bracket 115 illustrated in FIG. 6 are provided merely to illustrate various shapes available to cover the top surfaces or the top and lateral surfaces of the electrode plates 113, but it should be appreciated that the shapes of the bracket are not limited thereto. Additionally, the bracket 115 may be formed of a conductive material or a non-conductive material selectively according to the embodiment environment or the design structure which is employed.

The bracket 115 illustrated in (a) of FIG. 6 has a protrusion 116 having a predetermined thickness and formed at a predetermined height of an inner circumference thereof. A circuit board 114 having the electrode plates 113 of the transmission electrode 110 and the reception electrode 120 thereon is placed on one side surface of the protrusion 116, the antistatic device 300 is placed on the other surface of the protrusion 116, that is, on the top of the device shown, and a dielectric layer 112 having a predetermined gap (i.e., an air layer) or made of an insulating material is formed among the electrode plate 113, the antistatic device 300, and the bracket 115 according to a thickness of the protrusion 116.

The bracket 115 illustrated in (b) of FIG. 6 has a protrusion 117 formed by cutting away an inner circumference of one end to have a depth corresponding to a thickness of the antistatic device 300, the antistatic device 300 is placed on the protrusion 117, that is, on the top of the device shown, and in order to form the dielectric layer 112 between the antistatic device 300 and the electrode plate 113, the circuit board 114 having the electrode plates 113 of the transmission electrode and the reception electrode formed thereon may be attached or fixed with a predetermined gap therebetween. Here, the circuit board 114 may be attached such that a surface thereof on which the electrode plate 113 is formed faces the antistatic device 300. Also, the dielectric layer 112 may be formed of an insulating material instead of the predetermined gap.

The bracket 115 illustrated in (c) of FIG. 6 is some different from the bracket 115 illustrated in (b) of FIG. 6, in that a protrusion 117 is formed by cutting away an inner circumference of one end to have a depth corresponding to the sum of thicknesses of the antistatic device 300 and the dielectric layer 112. The antistatic device 300 may be attached to the interior of an end at which the cutaway starts, that is, the top of the device shown, and the circuit board 114 on which the electrode plate 113 of the transmission electrode and the reception electrode is formed may be attached to an end of the protrusion 117 at which the cutaway ends. Here, the circuit board 114 may be attached or fixed such that a surface on which the electrode plate 113 is formed faces the antistatic device 300. Also, the dielectric layer 112 may be formed of an insulating material or an air layer and is configured to be disposed between the antistatic device 300 and the electrode plate 113.

The bracket 115 illustrated in (d) of FIG. 6 is formed using a conductive member formed of an antistatic material such as conductive plastic or polymer, and the bracket 115 itself serves as the antistatic device 300 and housing. The bracket 115 may have a hexahedral shape with one side opened. Here, the opened side of the bracket 115 will be referred to as an opened side and a closed side formed in the opposite to the opened side will be referred to as a closed side, for the sake of convenience. Here, in order to form the dielectric layer 112 from the closed side of the bracket 115, the circuit board 114 on which the electrode plate 113 of the transmission electrode and the reception electrode is formed may be attached or fixed in the bracket 115 with a predetermined gap from the closed side. Here, the circuit board 114 may be attached or fixed such that the surface on which the electrode plate 113 is formed faces the antistatic device 300. Also, the dielectric layer 112 may be formed of an insulating material or an air layer of the gap and is disposed between the closed side of the bracket 115 and the top surface of the electrode plate 113.

The bracket 115 illustrated in (e) of FIG. 6 is formed such that a protrusion 117 is formed by cutting away an inner circumference of an end of the opened side, in the bracket 115 illustrated in (d) of FIG. 6, the circuit board 114 on which the electrode plate 113 of the transmission electrode and the reception electrode is formed is placed on the protrusion 117, and the dielectric layer 112 is formed to have a predetermined gap between the closed side of the bracket 115 and the electrode plate 113 according to a depth cut away to form the protrusion 117. Also, the dielectric layer 112 is formed of an insulating material or an air layer of the gap.

Here, the circuit board 114 and the antistatic device 300 may be fixed or attached to the bracket 115 by fitting, docking or plugging each other or using a member (not shown) (for example, a screw, bond, an adhesive tape, a bolt and nut, or the like) for fixing or attachment to prevent generation of vibration or detachment. Also, a thickness or a formation position of the protrusion 116 or 117 may be modified without being limited, and a length in which the protrusion 116 or 117 is formed or a length (distance) of the protrusion 116 or 117 may be modified without being limited. The following description may be commonly applied to the device for detecting a banknote thickness regardless of shapes of the bracket 115, and characteristics corresponding to a particular shape will be described with reference to a corresponding drawing.

As illustrated in FIG. 6, the transmission electrode 110 and the reception electrode 120 are fixedly disposed within the bracket 115, and the antistatic device 300 is attached or fixed to the upper outside of the bracket 115 (an outer surface facing the transmission electrode or the reception electrode). Here, the antistatic device 300 may have a thickness of about 0.5 mm, but the present invention is not necessarily thereto. A predetermined insulating space may be secured between the antistatic device 300 and the transmission electrode 110 and between the antistatic device 300 and the reception electrode 120.

Here, the transmission electrode 110 and the reception electrode 120 itself includes the circuit board 114 and the electrode plates 113 formed on one surface of the circuit board 114, and along with these elements, the bracket 115 and various electronic components mounted on the other surface of the circuit board 114 constitute the device for detecting a banknote thickness.

Meanwhile, although not shown in FIG. 6, the antistatic device 300 may be widely attached to an outer surface (namely, the upper outer surface facing transmission electrode and the reception electrode) of the bracket 115, as a film or sheet form to cover the top and lateral surfaces of the electrode plates 113 formed in each of the transmission electrode 110 and the reception electrode 120. Also, the bracket 115 may be configured to perform a function of the antistatic device 300. Namely, the bracket 115 may be formed using a conductive member formed of an antistatic material. For example, the antistatic material may have volume resistivity ranging from $10^2 \sim 10^6$ ($\Omega$cm).

The bracket 115 may fix the transmission electrode 110 or the reception electrode 120 such that vibration is not generated mechanically. One or more protrusions 116 or 117 may be formed in an inner circumference of the bracket 115 to allow the circuit board 114 of the transmission electrode 110 and the reception electrode 120 to be placed thereon at a predetermined depth (or height). Accordingly, a predetermined gap is formed between the electrode plate 113 formed on the circuit board 114 and the antistatic device 300 or the antistatic layer due to the bracket 115 formed as a conductive member made of an antistatic material.

The gap forms the dielectric layer 112. The dielectric layer 112 may be formed to have a thickness of about 0.5 mm, but the present invention is not necessarily limited thereto. The dielectric layer 112 may be formed of air, or a material having high insulating properties or high permittivity and being stable. This is because effective sensitivity of the electrode plate 113 is increased as permittivity is higher. For example, the dielectric layer 112 may be formed of an insulating film sheet formed of a stable material or a material having excellent electrical insulating properties without aging, such as silkscreen ink that can be printed on a circuit board.

In addition, the bracket 115 illustrated in (f) of FIG. 6 has a groove (or concave) 118 formed by partially cutting away an outer circumference of one end to have a predetermined depth, and the antistatic device 300 has a hexahedral shape with one side opened and a protrusion 117 formed along an inner circumference of an end of the opened side. The protrusion 117 and the groove 118 are configured to be coupled by fitting and engaging each other. The circuit board 114 on which the electrode plates 113 of the transmission electrode and the reception electrode are formed is attached or fixed to the inside of the bracket 115 to form the dielectric layer 112 to have a predetermined gap from the closed side of the antistatic device 300. Here, the circuit board 114 may be attached or fixed such that a surface thereof on which the electrode plate 113 is formed faces the antistatic device 300. Alternatively, the bracket 115 may be formed to have a protrusion 117 formed along an outer circumference of one end, and the antistatic device 300 has a hexahedral shape with one side opened and a groove 118 formed by partially cutting away an inner circumference of an end of the opened side to have a predetermined depth to be fitted and engaged each other. Such structure is configured to fix or attach the circuit board 114 and the dielectric layer 112, etc., to the closed side of the antistatic device 300 rather than to the bracket 115 and allows the antistatic device 300 to serve as a protecting cover as well as static electricity removal.

Further, the bracket structure illustrated in (g) of FIG. 6 consists of a first bracket 115 and a second bracket 115' formed to cover and surround the first bracket 115. The first bracket 115 has a groove (or concave) 118 formed by partially cutting away an outer circumference of one end to have a predetermined depth, and the second bracket 115' has a hexahedral shape with one side opened and a protrusion 117 formed along an inner circumference of an end of the opened side. The protrusion 117 and the groove 118 are configured to be coupled by fitting and engaging each other. The antistatic film 300 coated on an insulating substrate 112 which serves as the dielectric layer is disposed and attached to the closed side of the second bracket 115', and the circuit board 114 on which the electrode plates 113 of the transmission electrode and the reception electrode are formed is attached or fixed to the inside of the first bracket 115 and under the insulating substrate 112. Here, the circuit board 114 may be attached or fixed such that a surface thereof on which the electrode plate 113 is formed towards the second bracket 115'. Alternatively, the first bracket 115 may be formed to have a protrusion 117 formed along an outer circumference of one end, and the second bracket 115' has a hexahedral shape with one side opened and a groove 118 formed by partially cutting away an inner circumference of one end to have a predetermined depth to be fitted and engaged each other. Such structure is configured to fix or attach the circuit board 114 and the insulating substrate 112, etc., to the closed side of the second bracket 115' rather than to the first bracket 115. The second bracket 115' serves as a protecting cover and the antistatic film 300 coated on the insulating substrate 112 performs a static electricity removal function.

Additionally, the bracket structures illustrated in FIG. 6 may be configured to have tapered edges to prevent the banknote from being jammed between the transmission electrode 110 and the reception electrode 120.

Meanwhile, electronic components for driving the transmission electrode 110 or the reception electrode 120 may be mounted on the opposite side of the circuit board 114 on which the electrode plates 113 are formed. For example, the driving voltage applying unit 210, the current detecting unit 220, the controller 400, or the like, may be mounted as electronic components on the circuit board 114.

When the banknote 10 is input between the transmission electrode 110 and the reception electrode 120, the controller 400 controls the driving voltage applying unit 210 to apply a driving voltage at a pre-determined frequency to the transmission electrode 110 and the reception electrode 120. The controller 400 analyzes a detected signal through the current detecting unit 220 to detect and/or discriminate a type of the banknote, a state of the banknote or a thickness of the banknote. Here, there is a factor (for example, static electricity, vibration, or the like) that makes the signal output from the current detecting unit 220 unstable. Static electricity may be removed by the antistatic device 300 and vibration may be removed by firmly fixing the transmission electrode 110 and the reception electrode 120 with the bracket 115.

The controller 400 may analyze the signal detected by the current detecting unit 220 to detect moisture on the banknote 10 or a hologram, a security thread (or a partially exposed security thread) in the banknote 10. In other words, a banknote containing moisture, a hologram, or a security thread (or a partially exposed security thread) may be detected. For example, as illustrated in (a) of FIG. 7, in case of a new banknote, a line of electric force generated is absorbed to the security thread having a metal component, a drop is generated in a detected signal. In case of an old banknote, since it includes an internally broken security thread in many cases, a partial drop is generated as illustrated in (b) of FIG. 7. Also, as illustrated in (c) of FIG. 7, when a banknote has a hologram as a security element, since a line of electric force is absorbed to a metal component of the hologram, a level the signal is lowered to output a corresponding waveform, and as illustrated in (d) of FIG. 7, in a case in which an adhesive tape is attached onto a banknote, a corresponding waveform is output, and as illustrated in (e) of FIG. 7, when an adhesive tape is attached onto a moist banknote, a corresponding waveform is output.

Figure 7:
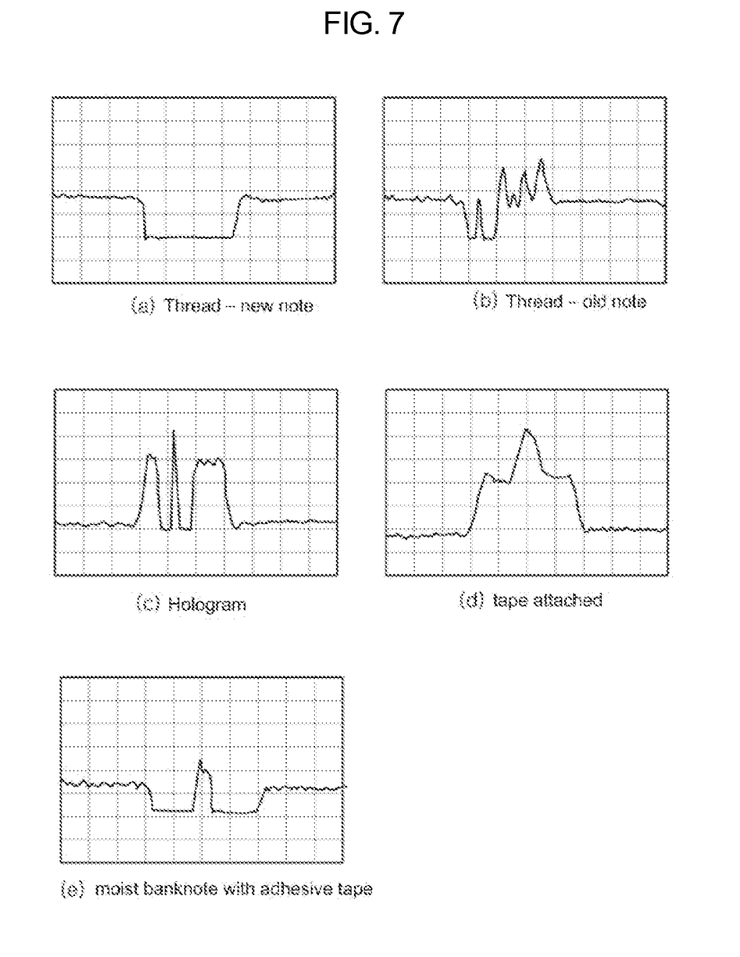
FIGS. 7(a)-(e) are views illustrating waveforms of voltages according to types, thicknesses, or states of banknotes detected by the device for detecting a banknote thickness according to an exemplary embodiment of the present invention.

The controller 400 analyzes the signal detected by the current detecting unit 220 and determines a thickness, a state or a type of a banknote according to a corresponding voltage level or voltage waveform. Thus, the device for detecting a banknote thickness according to the exemplary embodiment of the present invention may further include a memory (not shown) or a database (not shown) for storing a level and a waveform according to a state, a thickness or a type of a banknote. Here, the voltage waveforms and levels illustrated in FIG. 7 are illustrated merely to explain changes in waveforms or levels according to thicknesses, states or types of banknotes, but it should be appreciated that a state, a thickness or a type of a banknote is not necessarily detected limitedly by such waveform.

Figure 8:
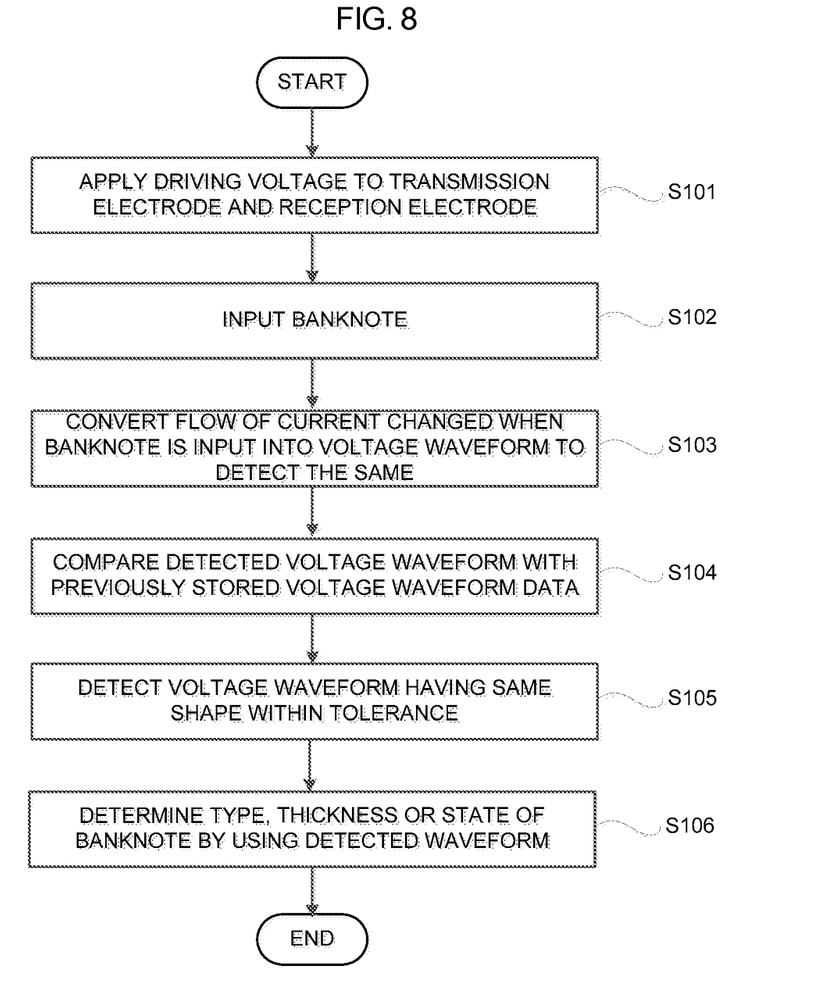
FIG. 8 is a flow chart illustrating a method for detecting a banknote thickness according to an exemplary embodiment of the present invention.

FIG. 8 is a flow chart illustrating a method for detecting a banknote thickness according to an exemplary embodiment of the present invention.

As illustrated in FIG. 8, the controller 400 applies a driving voltage having a particular pre-determined frequency between the transmission electrode 110 and the reception electrode 120 of the device for detecting a banknote thickness (S101). When the driving voltage having a particular pre-determined frequency is applied, an electric field is formed between the transmission electrode 110 and the reception electrode 120.

In the state in which the electric field is formed between the transmission electrode 110 and the reception electrode 120, the banknote 10 is input (S102). When the banknote 10 is input between the transmission electrode 110 and the reception electrode 120 of the device for detecting a banknote thickness, permittivity is changed according to a thickness, a state or a type of the banknote 10, and therefore, there is generated a difference in a current detected in the reception electrode 120 according to the changed permittivity.

Thus, the controller 400 converts a flow of the changed current when the banknote 10 is input or present into a voltage waveform to detect it (S103). Of course, the controller 400 may output a current waveform itself detected by the current detecting unit 220. Here, it is assumed that voltage waveform (or voltage level) data according to states, thicknesses or types of banknotes has been stored in an internal memory (not shown) in advance.

Then, the controller 400 compares the detected voltage waveform with the voltage waveform data according to thicknesses, states or types of banknotes stored in the internal memory (not shown) in advance (S104), and then, detects a voltage waveform having the same or similar shape within tolerance (S105).

Next, the controller 400 determines a thickness, a state or a type of the input banknote using the compared and detected voltage waveform (S106).

Meanwhile, in the above, the comparison of the voltage waveform has been described, but according to an exemplary embodiment, it may be configured such that the current detecting unit 220 may detect a current waveform and the controller 400 may compare the detected current waveform with current waveform data stored in the internal memory to determine a thickness, a state or a type of an input banknote.

The device for detecting a banknote thickness according to the exemplary embodiments of the present invention may be used alone or may also be used for the purpose of complementing a function of the related art device for detecting a banknote thickness.

The foregoing embodiments and advantages are merely exemplary and are not to be considered as limiting the present invention. It will be apparent to those skilled in the art that modifications and variations can be made without departing from the spirit and scope of the invention. This description is intended to be illustrative, and not to limit the scope of the claims. Also, although an embodiment has not been described in the above disclosure, it should be extensively construed within the scope of the technical concept defined in the claims. And, various changes and modifications that fall within the scope of the claims, or equivalents of such scope are therefore intended to be embraced by the appended claims.

What is claimed is:
1. A device for detecting a banknote thickness, the device comprising:
a transmission electrode and a reception electrode having surfaces facing one another at a predetermined interval and forming an electric field when a driving voltage is applied thereto;
a driving voltage applying unit configured to apply the driving voltage and form the electric field between the transmission electrode and the reception electrode;
a current detecting unit configured to detect a current when a banknote is between the transmission electrode and the reception electrode;
an antistatic device configured to remove static electricity from the banknote, wherein the antistatic device comprises a conductive material having a predetermined thickness, the antistatic device covers the surfaces of the transmission electrode and the reception electrode facing one another, and the antistatic device is insulated from the transmission electrode and the reception electrode; and
a controller configured to detect at least one of a changed current when the banknote is present and a corresponding voltage waveform, and detect or discriminate among one or more of a state, a thickness and a type of the banknote based on the detected current change or voltage waveform.

2. The device of claim 1, wherein the transmission electrode and the reception electrode each comprise one or more electrode plates at regular intervals on a circuit board, and the electrode plates comprise aluminum, silver, copper or an alloy thereof.

3. The device of claim 1, further comprising a bracket configured to mechanically fix and/or combine the transmission electrode and the reception electrode.

4. The device of claim 1, wherein the antistatic device has a volume resistance in a range from $10^2$ Ω·cm to $10^6$ Ω·cm.

5. The device of claim 3, wherein the bracket has an inner circumference and includes one or more protrusions a predetermined height or distance along the inner circumference, and the device further comprises a circuit board including electrode plates of the transmission electrode or the reception electrode on the protrusion to form a dielectric layer having a predetermined gap between the electrode plates.

6. The device of claim 3, wherein the bracket has an inner circumference and includes a protrusion having a predetermined thickness on the inner circumference, the device further comprises a circuit board having electrode plates of the transmission electrode or the reception electrode on one surface of the protrusion, the antistatic device is on another surface of the protrusion, and a dielectric layer having a predetermined gap is among the electrode plates, the antistatic device, and the bracket.

7. The device of claim 3, wherein the bracket has a protrusion at a depth corresponding to a thickness of the antistatic device, the antistatic device is on the protrusion, and the device further comprises a circuit board having electrode plates of the transmission electrode or the reception electrode thereon to form a dielectric layer.

8. The device of claim 3, wherein the bracket has a protrusion at a depth corresponding to a sum of thicknesses of the antistatic device and a dielectric layer, the antistatic device is attached to an interior and/or end of the bracket, and a circuit board including electrode plates of the transmission electrode or the reception electrode is attached to an end of the protrusion.

9. The device of claim 3, wherein the bracket comprises a conductive member comprising an antistatic material, the bracket has a hexahedral shape with an open side and a closed side, and the device further comprises a circuit board including electrode plates of the transmission electrode or the reception electrode with a predetermined gap therebetween, forming a dielectric layer at the closed side.

10. The device of claim 3, wherein the bracket comprises a conductive member comprising an antistatic material, the bracket has a hexahedral shape with an open side, an inner circumference, and a protrusion at a predetermined depth on the inner circumference at the open side, and the device further comprises a circuit board including electrode plates of the transmission electrode or the reception electrode on the protrusion, and a dielectric layer having a predetermined gap between a closed side of the bracket and the electrode plates.

11. The device of claim 3, wherein the antistatic device has a hexahedral shape with an open side and a closed side, an end of the open side of the antistatic device is fitted to and/or engaged with an end and/or side of the bracket, and the device further comprises a circuit board including electrode plates of the transmission electrode or the reception electrode with a predetermined gap therebetween forming a dielectric layer at the closed side.

12. The device of claim 3, wherein the bracket comprises a first bracket and a second bracket, an end and/or side of the first bracket is fitted to and/or engaged with an open end and/or side of the second bracket, the second bracket having a hexahedral shape, and an insulating substrate having an antistatic film thereon and a circuit board including electrode plates of the transmission electrode or the reception electrode form a closed side of the first bracket.

13. The device of claim 1, wherein the antistatic device comprises a film, a coated thin film, a layer, a sheet or a plate of said conductive material including a conductive plastic or polymer.

14. The device of claim 1, further comprising an antistatic member in front of the transmission electrode and the reception electrode in a direction in which the banknote is moving.

15. A device for detecting a banknote thickness, the device comprising:
a transmission electrode and a reception electrode having surfaces facing one another and forming an electric field when a driving voltage is applied thereto, wherein the transmission electrode and the reception electrode comprise:
an antistatic device comprising a conductive material on the surfaces of the transmission electrode and the reception electrode facing one another, wherein the conductive material has a predetermined thickness; and
a dielectric structure comprising an insulating material, between the electrodes and the antistatic device, insulating the antistatic device from the transmission electrode and the reception electrode.

16. The device of claim 15, further comprising a bracket configured to mechanically fix and/or combine the transmission electrode or the reception electrode.

17. The device of claim 16, wherein the bracket comprises one or more protrusions at a predetermined height or distance along an inner circumference of the bracket, and the device further comprises a circuit board including electrode plates of the transmission electrode or the reception electrode on the protrusion and forming a dielectric layer having a predetermined gap between the electrode plates and the bracket.

18. The device of claim 16, wherein the bracket comprises a conductive member comprising an antistatic material having a volume resistance of from $10^2$ Ω·cm to $10^6$ Ω·cm.

19. The device of claim 15, further comprising a detector configured to detect at least one of a changed current when a banknote is present between the transmission electrode and the reception electrode and a corresponding voltage waveform; and a discriminator configured to determine one or more of a state, a thickness and a type of the banknote based on the detected current or voltage waveform.

20. The device of claim 16, wherein the antistatic device has a hexahedral shape with one open side and a closed side, an end of the open side of the antistatic device is fitted to and/or engaged with an end and/or side of the bracket, and the device further comprises a circuit board including electrode plates of the transmission electrode or the reception electrode with a predetermined gap therebetween, forming a dielectric layer at the closed side of the antistatic device.

21. The device of claim 16, wherein the bracket comprises a first bracket and a second bracket, an end and/or side of the first bracket is fitted to and/or engaged with an open side of the second bracket, the second bracket having a hexahedral shape with the open side, and the device further comprises an insulating substrate having an antistatic film thereon and a circuit board including electrode plates of the transmission electrode or the reception electrode to form a closed side of the first bracket.

22. The device of claim 15, wherein the antistatic device comprises a film, a coated thin film, a layer, a sheet or a plate comprising said conductive material including a conductive plastic or polymer.

23. The device of claim 15, further comprising an antistatic member in front of the transmission electrode and the reception electrode in a direction in which the banknote is moving.

* * * * *